United States Patent [19]
Saito

[11] Patent Number: 6,038,010
[45] Date of Patent: Mar. 14, 2000

[54] APPARATUS FOR REPRODUCING DIGITAL SOUND SIGNALS FOR PROJECTORS

[75] Inventor: Etsuro Saito, Kanagawa, Japan

[73] Assignee: Sony Cinema Products Corporation, Culver City, Calif.

[21] Appl. No.: 09/011,666

[22] Filed: Feb. 9, 1998

Related U.S. Application Data

[63] Continuation of application No. PCT/JP97/02055, Jun. 13, 1997.

[30] Foreign Application Priority Data

Jun. 13, 1996 [JP] Japan .................................. 8-152543

[51] Int. Cl.⁷ .................................................. G03B 31/02
[52] U.S. Cl. ................................. 352/27; 352/29; 352/30
[58] Field of Search ................................. 352/27, 28, 29, 352/30, 14, 128

[56] References Cited

U.S. PATENT DOCUMENTS

| | | |
|---|---|---|
| 4,551,827 | 11/1985 | Custer et al. ................................. 352/1 |
| 5,155,510 | 10/1992 | Beard ......................................... 352/27 |
| 5,327,182 | 7/1994 | Kohut et al. ............................... 352/27 |
| 5,386,255 | 1/1995 | Beard et al. ................................. 352/5 |
| 5,596,380 | 1/1997 | Ozaki et al. ............................... 352/30 |

FOREIGN PATENT DOCUMENTS 7-230130  8/1995  Japan .

*Primary Examiner*—Russell Adams
*Attorney, Agent, or Firm*—Frommer Lawrence & Haug, LLP.; William S. Frommer

[57] ABSTRACT

A digital sound signal reproducing device 10 includes a reduced number of guide rolls and so forth by changing the mounting position of a sound drum 13. The digital sound signal reproducing device 10 is made up of a guide sprocket 11, a guide roll 14 and a sound drum 13, about which runs an image film 1. The sound drum 13 carries a optical readout device 20 for reading out and reproducing digital sound signals recorded on a digital sound signal recording portion 5 of the image film 1. The guide sprocket 11 is arranged in the vicinity of an image film supply port 10A supplied with the image film 1. The guide roll 14 is arranged in the vicinity of an image film output port 10B from which the image film 1 is led out. The guide sprocket 11 includes an image film running adjustment device 30 adapted for applying a running load on the image film 1 supplied to the optical readout device 20.

5 Claims, 6 Drawing Sheets

APPARATUS FOR REPRODUCING DIGITAL SOUND SIGNALS FOR PROJECTORS

This is a continuation of copending International Application PCT/JP97/02055 having an international filing date of Jun. 13, 1997.

TECHNICAL FIELD

This invention relates to a reproducing device for digital sound signals for a projector annexed to a digital projection apparatus of a digital sound projection system and which is configured for reproducing the digital sound signals by digital sound signal readout means from a digital sound signal recording unit provided in association with an image frame of a video film reeled out from an image film supply device.

BACKGROUND ART

An image film has a sound signal recording portion, along with contiguous image frames and a large number of perforations formed at a fixed interval for extending along both lateral sides along the film width for positively feeding the image frames. On this sound signal recording portion are recorded sound signals in association with the video frames.

In a recent imaging system, a so-called digital sound projection system is adopted, in which not only the analog sound but also the digital sound is used for achieving higher sound quality and improved theater-presence feeling by the stereo sound. The image film for the digital sound projection system is provided with a digital sound recording portion, in addition to an analog sound recording portion, in order to make up the sound signal recording portion by the analog and digital sound recording portions.

That is, the image film for the digital sound system is provided with the digital sound recording portions having the digital sound signals recorded thereon. Each of these digital sound recording portions is formed in association with contiguous image frames between the left-side row of perforations and the film edge and between right-side row of perforations provided at a spacing from each other along the film feed direction. These digital sound signals are read out and reproduced by a digital sound reproducing device 100 which will be explained subsequently.

The digital sound signal reproducing device 100 is constituted by a first guide roll 101, a guide sprocket 102, a sound drum 103 and a second guide roll 104. These components are combined with the digital projection device and constitute a film running path for an image film supplied from an automatic image film supply takeup device, not shown. The digital sound signal reproducing device 100 also includes first to fourth tension rolls 105 to 108 in order to permit the image film 1 to run in stability along the running path components. An optical readout device 120 for the digital sound signals as later explained is annexed to the sound drum 103.

A tension spring 109 for biasing the image film 1 against the guide sprocket 102 and the sound drum 103 by its resilient force is installed under tension across the second tension roll 106 and the third tension roll 107.

The image film 1 is reeled out from the automatic image film supply takeup device and thence supplied to an image film supply port of the digital sound signal reproducing device 100 so as to be placed around the first guide roll 101 and so as to be turned back in the horizontal direction. The image film 1 is led to the sound drum 103 via second tension roll 106 as the film is thrust by the first tension roll 105 against the guide sprocket 102. The image film 1 is turned back by this sound drum 103 so as to be placed around the second guide roll 104 as the film is thrust by the second tension roll 107 and the fourth tension roll 108 against the guide sprocket 102. The image film 1 is fed out at the image film outlet port of the digital sound signal reproducing device 100 via second guide roll 104 and thence supplied to a driving sprocket 111 operating as a driving source for entraining the film to the digital sound projection device.

The guide sprocket 102 is provided with a flywheel 110 coaxially with the axis of the guide sprocket 102, as shown by a dotted line in FIG. 1.

In the vicinity of the sound drum 103 is mounted an optical readout device 120 for digital sound signals. The optical readout device is made up of a readout light source, not shown, an optical fiber 121, an objective lens device 122 and a CCD line sensor 123.

In the optical readout device 120 for digital sound signals, a light beam radiated from a light source is led into the optical fiber 121 so as to be radiated to a digital sound recording portion of the image film 1 to form an image on a CCD line sensor 123 via an objective lens 122 in the form of optically bright and dark bar-code signals converted from the light beam.

Meanwhile, in the above-described digital sound projection system, a digital projector and the automatic film supply takeup device are usually mounted at a spacing of several meters from each other. In addition, the digital sound signal reproducing device 100 has no driving source and supports the image film 1 with an extremely weak force in the inner image film running path. Thus, the image film 1 reeled from the automatic film supply device is suspended by its own gravity or wobbled under the effect of an extremely small wind force in a projection room. Thus the film travels in a pulsating unstable state on the image film path as indicated by a film portion M in FIG. 1.

This wobbling phenomenon of the image film 1 operates as fluctuations in the load applied on the image film 1 by the driving sprocket 111 via the digital sound signal reproducing device 100 thus producing rotational fluctuations or wow on the driving sprocket 111. Thus, with the conventional digital sound signal reproducing device 100, the image film 1 cannot be run in stability.

Meanwhile, in the digital sound signal reproducing device 100, the image film 1 is run in a stable state by running the guide sprocket 102 in a stable state by employing a flywheel 110 used for increasing the inertia of the guide sprocket 102, as shown by a broken line in FIG. 1. However, this flywheel 110, operating effectively when the image film 1 runs on the guide sprocket 102 in a stable state, cannot play a sufficient role in stable running of the image film if the driving sprocket 111 undergoes rotational fluctuations due to the wobbling phenomenon of the imaging film 1.

Thus, in the digital sound reproducing device 100, a problem is raised that digital sound signal clocks are produced such that readout of the digital sound signals recorded in the digital sound signal recording portion of the image film 1 fails to occur reliably at a constant timing in the optical readout device 120, thus causing the interrupted playback sound.

For overcoming this drawback, it may be contemplated to provide in the above-described digital sound reproducing device 100 driving units at the image film supply port and at the image film outlet port synchronously rotated for driving the imaging film 1 for preventing the running in a pulsating unstable state of the image film 1.

However, with this digital sound signal reproducing device, there arises a necessity of driving the driving unit in reliably synchronism with the automatic film supply takeup device or the driving sprocket o the digital projection device, thus complicating and increasing the size of the main body portion of the device. Moreover, since the driving unit is provided in the digital sound signal reproducing device, there arises the necessity of modifying and newly constructing the basic specifications of component devices of the digital sound projection system.

For overcoming the above drawbacks, it may be contemplated to increase the tension applied to the tension rolls 105 to 108 provided in the digital sound signal reproducing device 100 in order to permit the image film 1 to run in a perpetually taut state. With this digital sound signal reproducing device, since the image film 1 is perpetually run under a large tension, a driving force more powerful than the driving sprocket is required, thus giving rise to the necessity of modifying and newly constructing the basic specifications of the component parts of the digital sound projection system.

In addition, if the imaging film 1 is run under perpetually large tension on the film running path, film perforations tend to be deformed and destroyed. On the other hand, the film surface tends to be damaged to reduce the service life of the film.

It is therefore an object of the present invention to provide a digital sound signal reproducing device whereby the image film can be run in stability to improve reliability in reproduction and to simplify the structure of the main body portion of the device.

DISCLOSURE OF THE INVENTION

A digital sound signal reproducing device for a projector according to the present invention includes first guide means arranged in the vicinity of a supply port supplied with an image film and about which runs the image film, second guide means arranged in the vicinity of an outlet port adapted for sending out an image film and about which runs the image film, a sound drum arranged between the first guide means and the second guide means and film and about which runs the image film and digital sound signal readout means annexed to the sound drum for reading out and reproducing the digital sound signals recorded on a digital sound signal recording portion of the image film.

With this digital sound signal reproducing device for the projector according to the present invention, the running image film is supplied via a supply port and placed approximately 90° about the first guide means so as to be turned to the horizontal direction. At this time, a rotational load is applied to the first guide means by a braking force produced by the image film running adjustment device and hence the film runs on the first guide means in a state freed of wobbling.

The image film runs approximately 180° around the sound drum. At this time, the digital sound signals recorded on the digital sound signal recording portion are read out and reproduced in a stable state.

The image film is run about approximately 90° around the second guide roll so as to be led out at the outlet port.

BEST MODE FOR CARRYING OUT THE INVENTION

Figure 1:
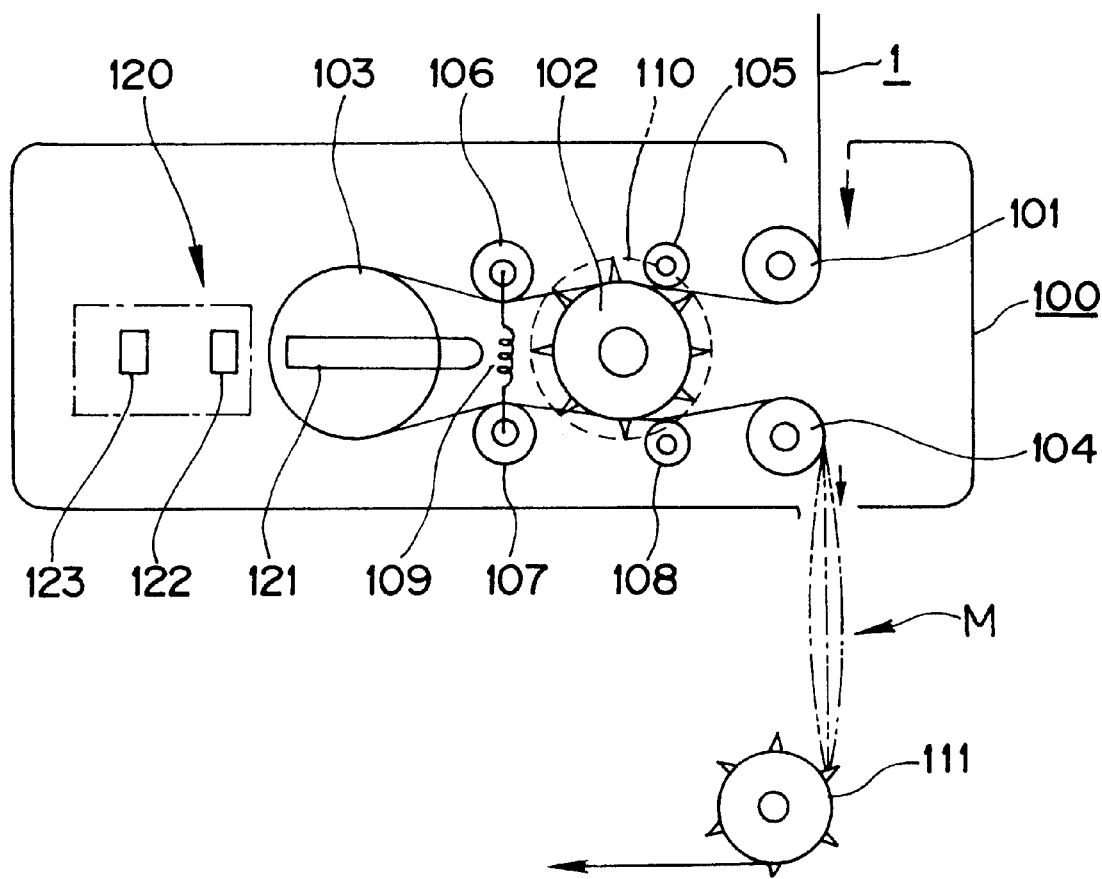
FIG. 1 is a schematic view showing a conventional digital sound reproducing device.

Referring to the drawings, preferred embodiments of the present invention will be explained in detail.

Figure 2:
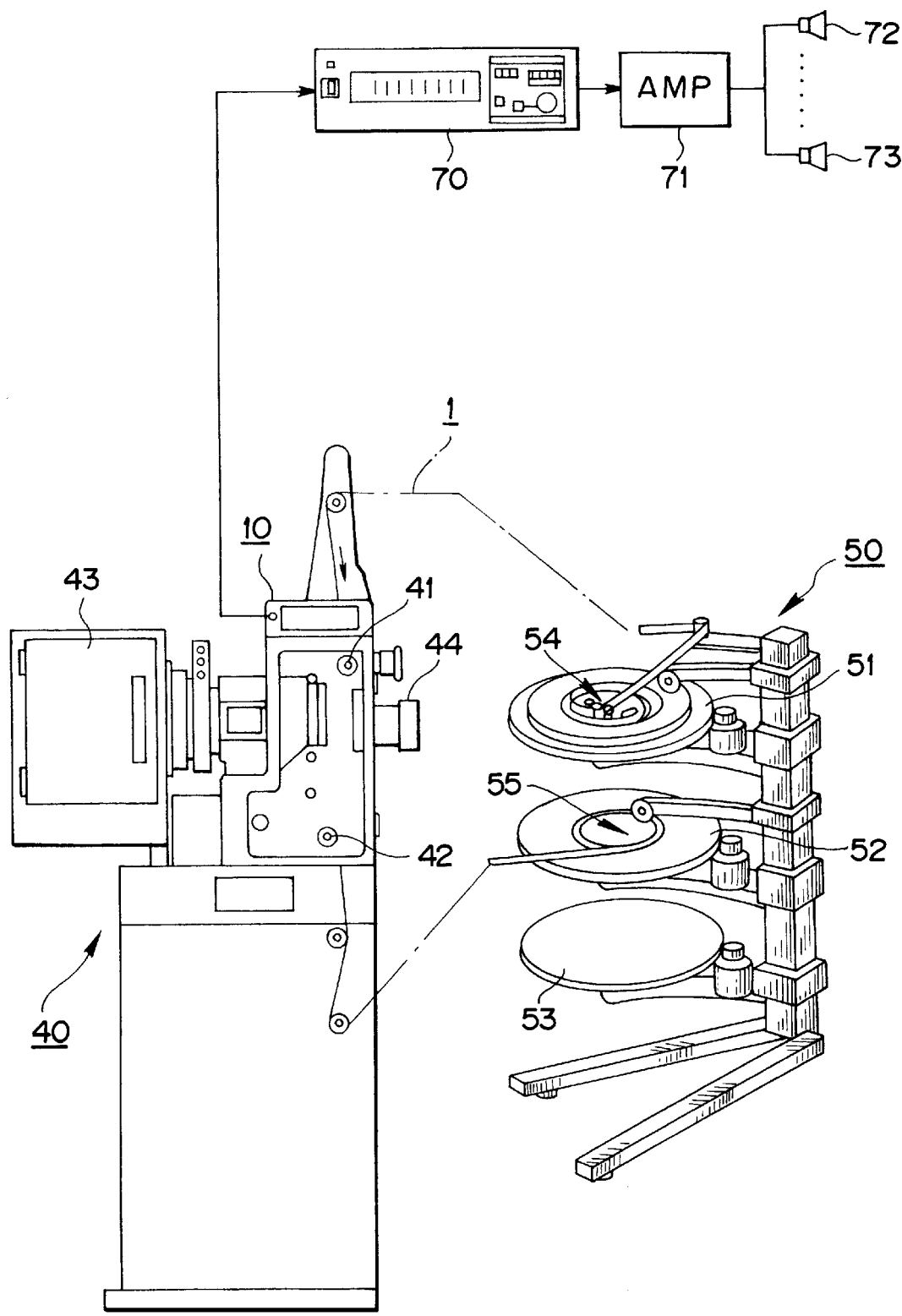
FIG. 2 is a schematic view showing a digital sound projection system provided with a digital sound reproducing device according to the present invention.

A digital sound signal reproducing device 10, embodying the present invention, constitutes a digital sound projection system, as shown in FIG. 2. The image film used in this digital sound projection system realizes theater-presence feeling by the high sound quality and the stereo sound by using the digital sound in conjunction with the analog sound.

Figure 3:
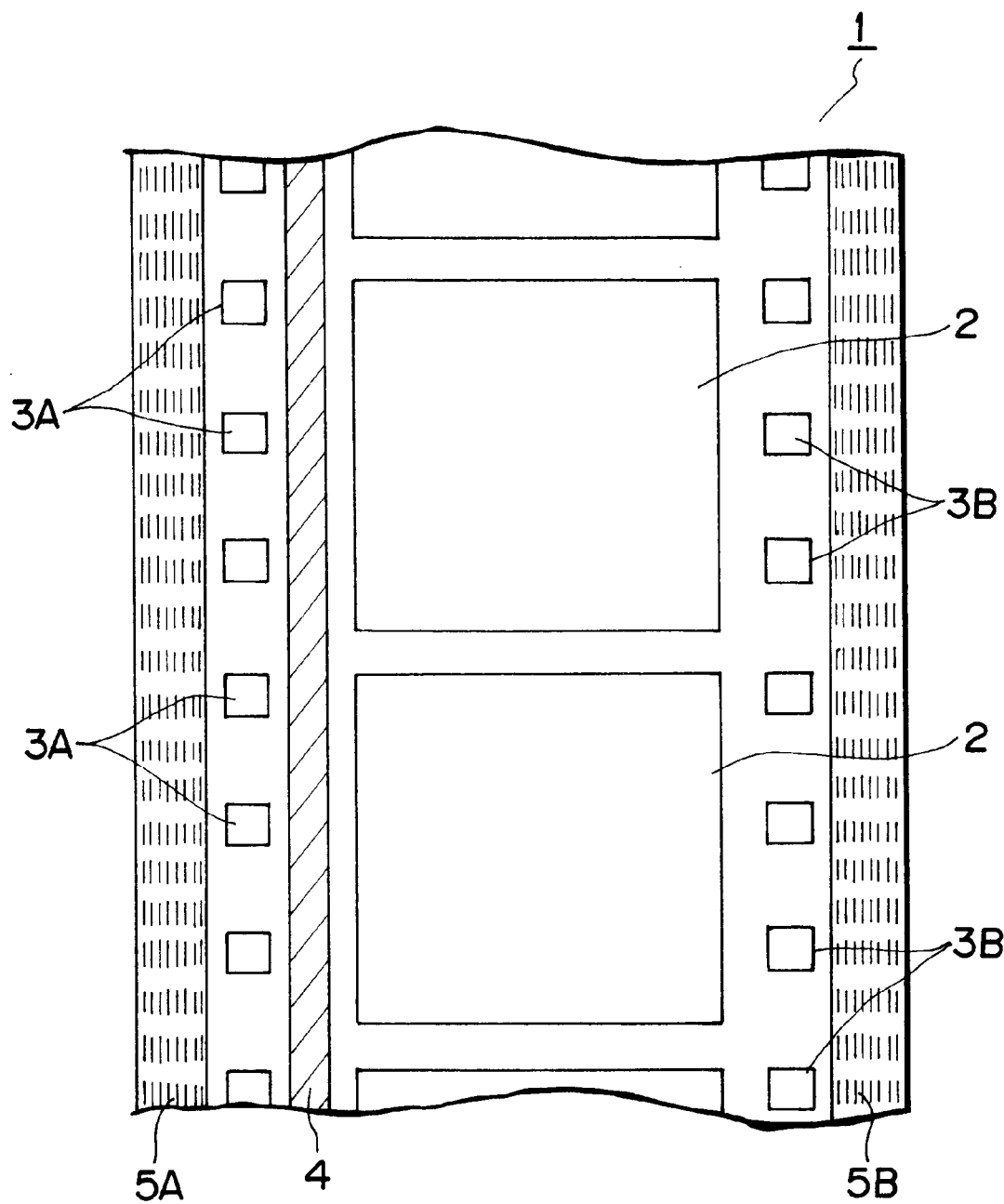
FIG. 3 is a plan view showing an imaging film employed in the digital sound reproducing device shown in FIG. 2.

Referring to FIG. 3, left and right rows of perforations 3A, 3B are bored side-by-side at a pre-set separation in the film feed direction in association with contiguous image frames 2. An analog sound signal recording portion 4 having an analog sound signal recorded therein is provided between the perforations 3A and the image frame 2. On the other hand, digital sound signal recording portions 5A, 5B, having the digital sound signal recorded therein, are formed between the perforations 3A and one film edge and between the other perforations 3B and the opposite film edge, respectively.

The analog sound signal recorded in the analog sound signal recording portion 4 is constituted by a band-shaped light-shielding portion, having its width varied continuously in association with the speech waveform. The speech associated with the image frame 2 is recorded by converting changes in the transmitted volume of the irradiated light into changes in the quantity of electricity. The digital sound signal recorded in the digital sound signal recording portions 5A, 5B is constituted by a bar code arranged as a pattern in a direction intersecting the running direction of the image film 1. The digital sound signal is read out and reproduced by a digital sound signal reproducing device 10 which will be explained subsequently.

The digital sound projection system is made up of an automatic image film supply takeup device 50 for reeling out and taking up the image film 1, the digital sound signal reproducing device 10 for reading out and reproducing the digital sound signal from the image film 1 supplied from the automatic image film supply takeup device 50 and a digital projection device 40 for projecting the image film 1 running in the digital sound signal reproducing device 10.

The automatic image film supply takeup device 50 is made up of a supply turntable 51, a takeup turntable 52 and a spare turntable 53. These turntables 51 to 53 are each of a diameter approximately equal to 1.5 meter, as shown in FIG. 2, for winding the image film 1 comprised of plural films connected together to an extremely long length for constituting a motion picture title. At a mid portion of the takeup turntable 52 is arranged a reel-out adjustment device 54 for controlling rotation of the takeup turntable 52 for adjusting reel-out of the image film 1. At a mid portion of the takeup turntable 52 is similarly arranged a takeup adjustment device 55 for controlling rotation of the takeup turntable 52 for adjusting takeup of the image film 1.

The image film 1 wound on the supply turntable 51 is sequentially reeled out from its inner rim side to its outer rim side and thence supplied to the digital sound signal reproducing device 10 from the supply turntable 51, rotation of which is controlled by the takeup adjustment device 55. The image film 1, supplied to the digital projection device 40, is sequentially taken up from an inner rim towards an outer rim of the takeup turntable 52 rotation of which is controlled by the takeup adjustment device 55.

Referring to FIG. 2, the digital sound signal reproducing device 10 is annexed to the digital projection device 40. The digital sound signal reproducing device 10 reproduces the digital sound signal from a digital sound signal recording portion 5 provided in association with the image frame 2 of the image film 1 supplied from the automatic image film supply takeup device 50.

Figure 4:
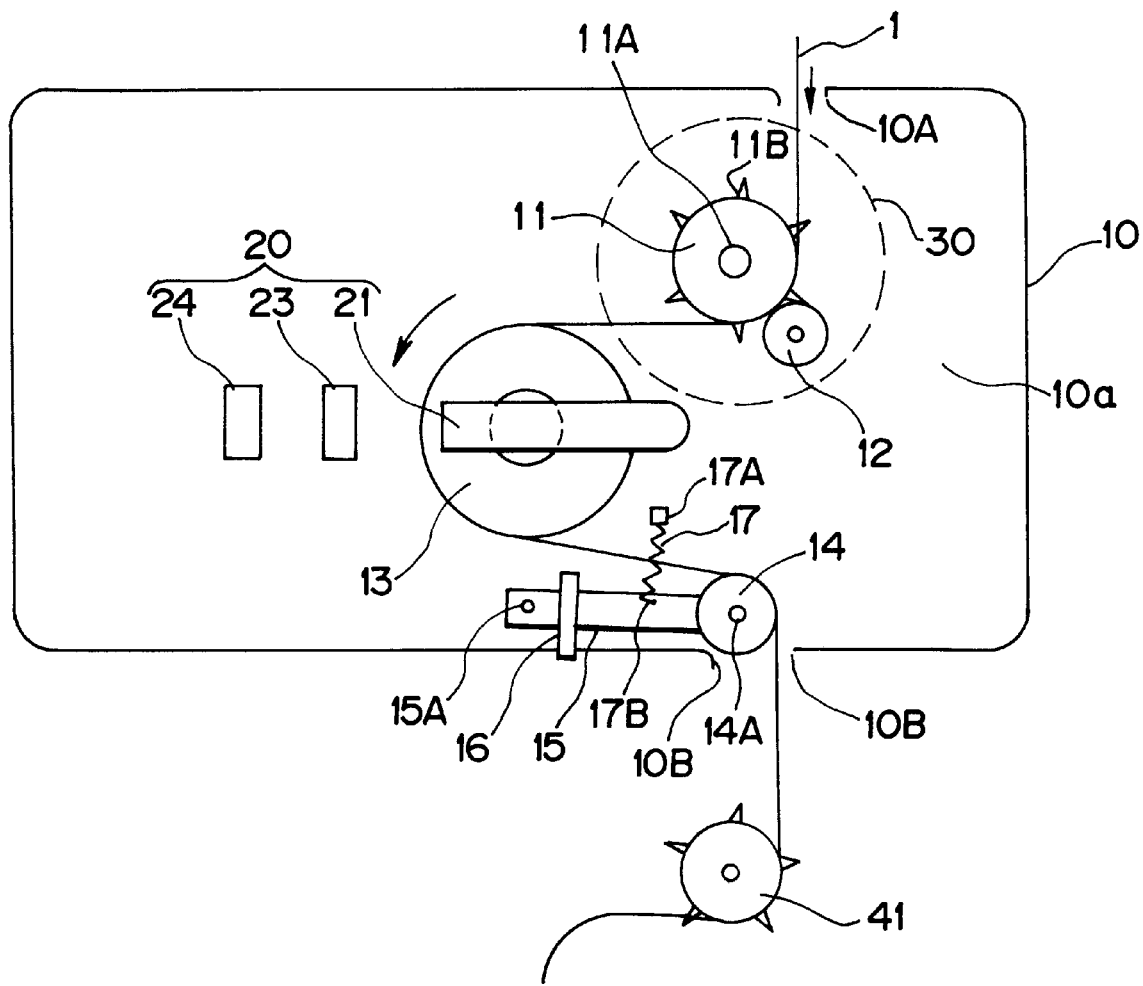
FIG. 4 is a schematic view showing the digital sound reproducing device shown in FIG. 2.

Referring to FIG. 4, the digital sound signal reproducing device 10 includes a guide sprocket 11, a tension roll 12, a sound drum 13 and a guide roll 14, making up a travel path for the image film 1 supplied from the automatic image film supply takeup device 50.

The guide sprocket 11 is arranged towards an image film supply port 10A of the digital sound signal reproducing device 10. The guide sprocket 11 has a large number of feed pawls 11B in a circumferentially spaced positions. These feed pawls 11B, protuberantly formed in spaced apart positions along the width of the guide sprocket 11, are engaged by the perforations 3A, 3B of the image film 1. The image film 1 supplied to the guide sprocket 11 is engaged with its feed pawls 11B and turned approximately 90° so as to be then supplied to the sound drum 13.

Figure 5:
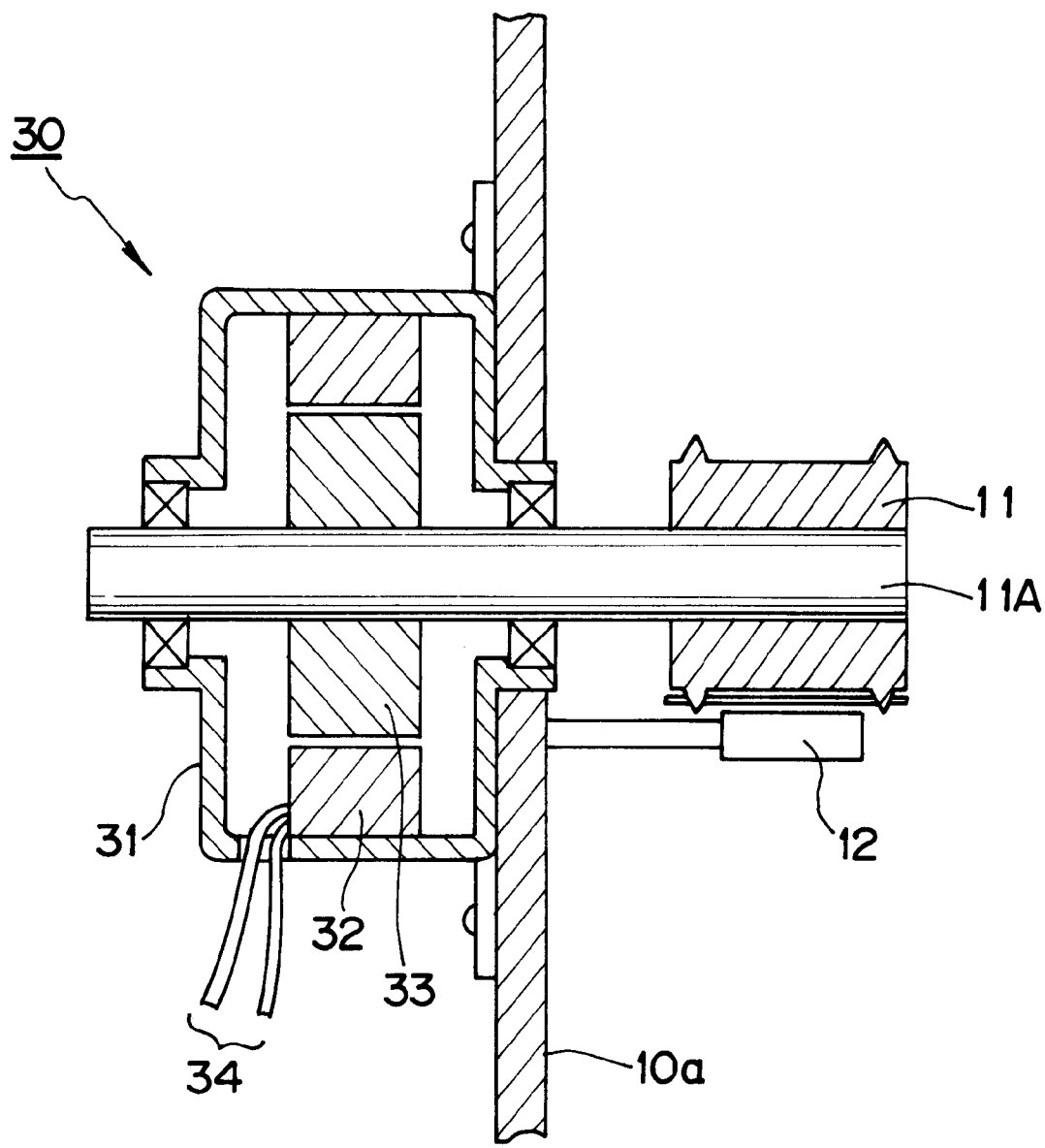
FIG. 5 is a longitudinal cross-sectional view showing an imaging firm running adjustment device of the digital sound reproducing device shown in FIG. 2.

The guide sprocket 11 is also provided with an image film running adjustment device 30 for enabling stable running of the image film 1 on the image film running path as indicated by a broken line in FIG. 4. The image film running adjustment device 30 is assembled to the pivot shaft 11A of the guide sprocket 11 passed through a side plate 10a of the digital sound signal reproducing device 10, as shown in FIG. 5.

The image film running adjustment device 30 is constructed similarly to an ac induction motor and is made up of a hermetically sealed tubular casing 31, a ring-shaped stator 32 secured to the inner peripheral surface of the casing 31 and a disc-shaped rotor 33 secured to the pivot shaft 11A. The image film running adjustment device 30 uses an impressed voltage lower than the usual ac 100V. The tension applied to the image film 1 at the sound drum 13 of the image film running adjustment device 30 is set to approximately 350 gf.

If, with the image film running adjustment device 30, the dc current is fed to a power source cord 34 whilst rotational fluctuations are induced in a driving sprocket 41 due to the wobbling phenomenon of the image film 1, an eddy current is produced between the stator 32 and the rotor 33 such that a braking force is applied to the rotor 3. The image film running adjustment device 30 allows the image film 1 to run in stability on the image film travel path of the digital sound signal reproducing device 10 so that the image film can be placed positively around the sound drum 13.

The tension roll 12 is arranged in pressure contact with the guide sprocket 11. The tension roll 12 allows the running image film 1 to run in stability by thrusting the image film against the guide sprocket 11.

The sound drum 13 is arranged towards a digital sound signal optical readout device 20 which will be explained subsequently. The sound drum 13 engages with the image film 1 fed out from the guide sprocket 11 so that the film is turned approximately 180° so as to be sent out to the guide roll 14. To the sound drum 13 is annexed a readout light source 21 for reading out the digital sound signals.

The guide roll 14 is arranged towards the image film outlet port 10B of the digital sound signal reproducing device 10. The guide roll 14 is rotatably supported by a pivot shaft 14A supported on a free end of a lever 15 having its one end supported in a cantilever fashion by the pivot shaft 15A. The lever has a pivot shaft 15A rotatably supported by a bearing, not shown, provided on a side plate 10a of the digital sound signal reproducing device 10. The guide roll 14 engages with the image film 1 fed out from the sound drum 13 to turn the film approximately 90° to feed out the film to the driving sprocket 41 of the digital projection device 40. The lever 15 is associated with a sensor 16 disposed in the vicinity of the pivot shaft. The sensor 16 detects the position of the rotational direction in a known manner. An output of the sensor 16 is fed to a feedback controller, not shown, for controlling the impressed voltage used in the above-mentioned image film running adjustment device 30.

A tension spring 17 has its one end 17A secured to the side plate 10a of the digital sound signal reproducing device 10 while having its other end 17B engaged with the lever 15. Thus, the tension spring 17 biases the guide roll 14 supported by the lever 15 counterclockwise in FIG. 4. Meanwhile, the tensile force exerted by the tension spring 17 is extremely weak such that no running load is applied to the image film 1 running on the image film travel path.

Figure 6:
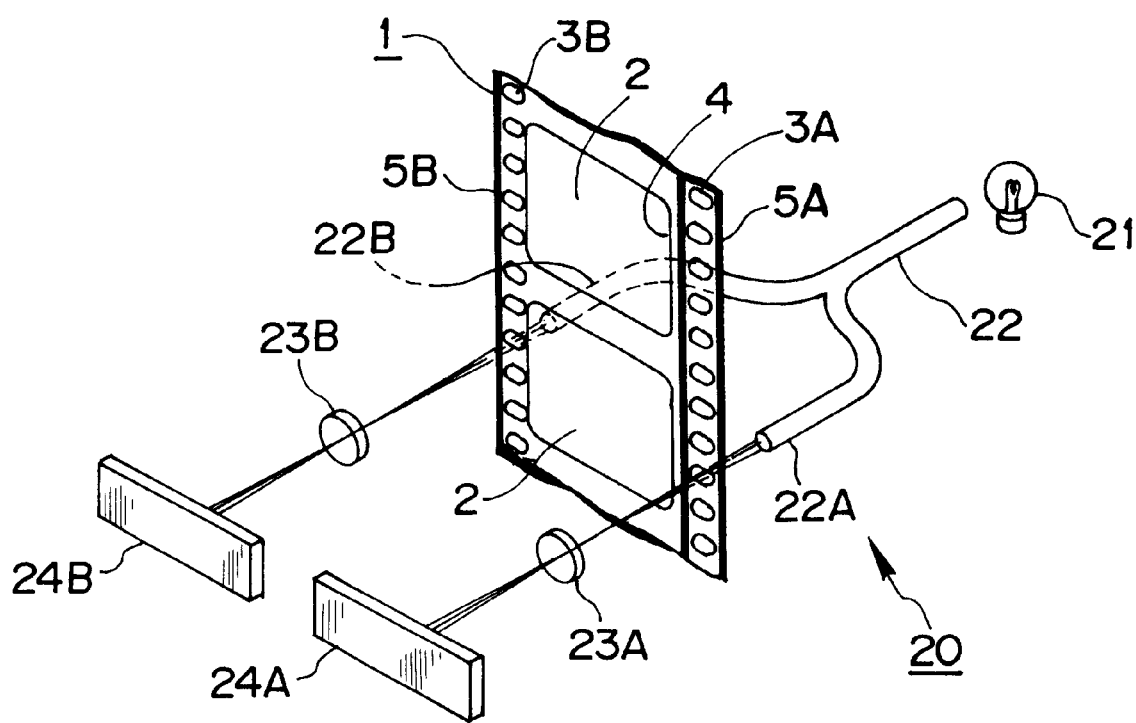
FIG. 6 is a schematic view showing an optical readout device of the digital sound reproducing device shown in FIG. 2.

Referring to FIG. 6, the digital sound signal optical readout device 20 is made up of a readout light source 21, an optical fiber 22, objective lens units 23A, 23B and CCD line sensors 24A, 24B. The optical fiber 22 has its one end facing the readout light source 21, while having its other end bifurcated and facing digital sound signal recording portions 5A, 5B of the image film 1.

The objective lens units 23A, 23B and the CCD line sensors 24A, 24B are arranged on the optical axes of bifurcated ends 22A, 22B of the optical fiber 22 via the digital sound signal recording portions 5A, 5B of the image film 1. The digital sound signals recorded on the digital sound signal recording portions 5A,5B are imaged via objective lenses 23A, 23b on CCD line sensors 24A, 24B, in the form of bright or dark optical bar code signals, converted from the light beam from the readout light source 21, by the light beam being led to the optical fiber 22 from the readout light source so as to be illuminated from the bifurcated ends 22A, 22B to the digital sound signal recording portions 5A, 5B.

The CCD line sensors 24A, 24B convert the bright or dark optical bar code signals corresponding to the digital sound signals into electrical code signals which are outputted to a processor 70 as shown in FIG. 2.

The processor 70 processes the digital sound signals, read out and reproduced by the digital sound signal reproducing device 10, as an input, as shown in FIG. 2. An output of the processor 70 is entered via amplifier 71 to speakers 72, 73 of a speaker system in order for the viewer to hear the digital sound.

Referring to FIG. 2, the image film 1, which has traversed the digital sound signal reproducing device 10, is caused by the digital projection device 40 to run on the image film travel path by the driving sprockets 41, 42 as a driving source. A light source device 43 and a projection lens device 44 are arranged in the digital projection device 40 for facing the image film travel path provided between the digital projection device 40 and the driving sprockets 41, 42. The imaging light, illuminated from the light source device 43 to the image film 1, is transmitted through the image film 43 so as to be image-adjusted by a projection lens unit 44 before being projected on a screen.

In the above-described digital sound signal reproducing device 10 of the instant embodiment, the image film 1 reeled out from the automatic image film supply takeup device is supplied to the image film supply port 10A, as it is wobbled, and is engaged with the guide sprocket 11 so as to be turned in the horizontal direction. At this time, the rotational load is applied on the guide sprocket 11 by a braking force generated by the image film running adjustment device 30 so that the image film is run about the guide sprocket in a state freed of wobbling. Since the perforations 3A, 3B are engaged with the feed pawls 11B of the guide sprocket 11, the image film 1 runs on the guide sprocket 11 without the fluctuations in the running state caused by the wobbling being transmitted to the portion of engagement thereof with the sound drum 13. The image film 1 is guided to the sound drum 13 in a state in which the film compresses against the guide sprocket 11. At this time, the image film 1 is reproduced by the digital sound signals being read out in a stable state from the digital sound signal recording portions 5A, 5B by the optical readout device 20 annexed to the sound drum 13. The image film 1 then is turned on the sound track 13 to engage with the guide roll 14. The image film 1 is sent out via the image film outlet port of the digital sound signal reproducing device 10 via guide roll 14 so as to be supplied to the driving sprocket 41 operating as a driving source for entraining the film to the digital projection device 40.

In the above-described digital sound signal reproducing device 10, in which the image film running adjustment device 30 is provided on the pivot shaft 11A of the guide sprocket 11, the wobbling phenomenon of the image film 1 is resolved by the image film running adjustment device 30 operating as a rotational load for the guide sprocket 11 to assure stable running of the image film 1 and reliable signal reproduction. This enables reverse running of the present digital sound signal reproducing device 10.

Also, since the present digital sound signal reproducing device 10 has the guide sprocket 11, tension roll 12, sound drum 13 and the guide roll 14, the first and second guide rolls 101, 104, first to fourth tension rolls 105 to 108 and the tension spring 109 can be dispensed with to assure a simpler structure of the device.

Thus, with the present digital sound signal reproducing device 10, the image film mounting operation may be improved in efficiency to prevent the image film from being deformed, destroyed of damaged, thus lowering manufacturing cost.

With the above-described digital sound signal reproducing device according to the present invention, the image film running adjustment device provided in the first guide means operates as a rotational load for the first guide means, thus eliminating the wobbling phenomenon of the image film to assure stable running of the image film and reliable signal reproduction. This facilitates reverse running in the present digital sound signal reproducing device for a projector.

Moreover, the present digital sound signal reproducing device for a projector includes first guide means, second guide means and the sound drum, the plural tension rolls and tension rolls or the tension spring may be dispensed with to assure a simpler structure of the device.

Thus, with the present digital sound signal reproducing device for a projector, the image film mounting operation can be improved in efficiency, while the image film can be prevented from being deformed or destroyed to lower manufacturing costs.

We claim:

1. A digital sound signal reproducing device for a projector comprising:

a guide sprocket arranged in the vicinity of a supply port to which a motion picture film is supplied, said motion picture film running around said guide sprocket;

first guide means located adjacent to said guide sprocket such that the motion picture film is in contact only once with said guide sprocket during travel thereof through said digital sound signal reproducing device second guide means arranged in the vicinity of an exit port from which the motion picture film exits, said motion picture film running around said second guide means; said second guide means being rotatably supported by a pivot shaft supported on a free end of a lever;

a sound drum arranged between said first guide means and the second guide means, said motion picture film running around said sound drum;

digital sound signal readout means annexed to said sound drum for reading out and reproducing the digital sound signal recorded in a digital sound signal recording portion of the motion picture film;

said guide sprocket having a motion picture film running adjustment unit for applying a running load on the motion picture film supplied to said digital sound readout means; and sensing means associated with said lever for providing feedback to a feedback controller for controlling the impressed voltage of the image film running adjustment device.

2. The digital sound signal reproducing device for a projector as claimed in claim 1 wherein said first guide means is a guide sprocket engaged with perforations on an input side of the motion picture film to said sound drum and those on an output side of the motion picture film from the sound drum for guiding the motion picture film.

3. The digital sound signal reproducing device for a projector as claimed on claim 1 wherein said second guide means has a guide roll rotatably supported by a support lever biassed by resilient means towards one side and rotational position detection means provided on said support lever.

4. The digital sound signal reproducing device for a projector as claimed in claim 1 wherein said motion picture film running adjustment unit performs control for maintaining the running load applied to the motion picture film supplied to said digital sound signal readout means at a pre-set value.

5. The digital sound signal reproducing device for a projector as claimed in claim 1 wherein said motion picture film running adjustment unit includes a hermetically sealed tubular casing;

a ring-shaped stator secured to an inner peripheral surface of sac casing;

a support shaft; and a disc-shaped rotor secured to said supporting shaft;

said motion picture film running adjustment unit operating for generating an eddy current between the stator and the rotor if the motion picture film undergoes wobbling for applying a braking force to the rotor so that the unit acts as rotational load for said first guide means.

* * * * *